United States Patent
Burgermeister

(10) Patent No.: US 11,043,914 B2
(45) Date of Patent: Jun. 22, 2021

(54) CONTROL DEVICE FOR ACTUATING AN ELECTRIC MOTOR, ELECTRIC MOTOR AND SYSTEM HAVING A CONTROL DEVICE AND ELECTRIC MOTOR

(71) Applicant: Schmidhauser AG, Romanshorn (CH)

(72) Inventor: Andreas Burgermeister, Mauren (CH)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 16/624,426

(22) PCT Filed: Jun. 21, 2018

(86) PCT No.: PCT/EP2018/066565
§ 371 (c)(1),
(2) Date: Dec. 19, 2019

(87) PCT Pub. No.: WO2018/234440
PCT Pub. Date: Dec. 27, 2018

(65) Prior Publication Data
US 2020/0136552 A1    Apr. 30, 2020

(30) Foreign Application Priority Data

Jun. 21, 2017 (DE) .................... 10 2017 210 440.6

(51) Int. Cl.
*H02H 3/04* (2006.01)
*H02P 29/60* (2016.01)

(52) U.S. Cl.
CPC .................. *H02P 29/60* (2016.02)

(58) Field of Classification Search
CPC .......... H02P 29/60; H02P 23/00; H02P 29/00
See application file for complete search history.

(56) References Cited

U.S. PATENT DOCUMENTS

2014/0093228 A1*   4/2014   Gredegard   .............. G03B 3/04
396/97

FOREIGN PATENT DOCUMENTS

DE    10 2004 048 928 A1    4/2006
DE    10 2008 000 501 A1    9/2009

OTHER PUBLICATIONS

International Search Report (PCT/ISA/210) issued in PCT Application No. PCT/EP2018/066565 dated Sep. 21, 2018 with English translation (four (4) pages).

* cited by examiner

*Primary Examiner* — Karen Masih
(74) *Attorney, Agent, or Firm* — Crowell & Moring LLP

(57) ABSTRACT

A control device for actuating an electric motor has: a temperature sensor interface for connecting an external temperature sensor, wherein the temperature sensor is provided to monitor the temperature of the electric motor, and a monitoring unit, which is configured to evaluate at least one temperature-dependent property of the temperature sensor in order to monitor the temperature of the electric motor and to exchange data with the electric motor via the temperature sensor interface independently of and in addition to the temperature monitoring.

16 Claims, 1 Drawing Sheet

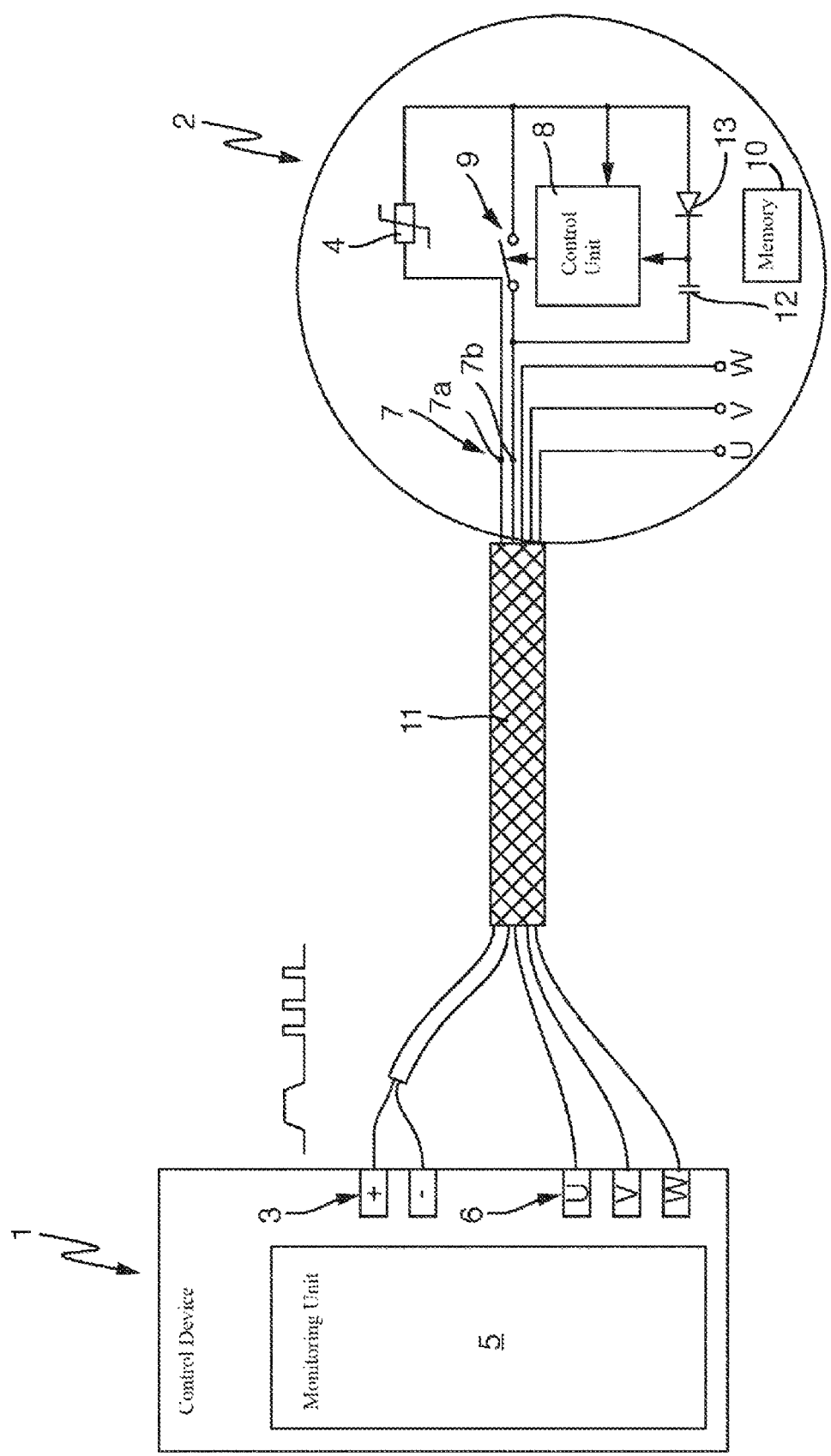

CONTROL DEVICE FOR ACTUATING AN ELECTRIC MOTOR, ELECTRIC MOTOR AND SYSTEM HAVING A CONTROL DEVICE AND ELECTRIC MOTOR

BACKGROUND AND SUMMARY OF THE INVENTION

The invention relates to a control device for actuating an electric motor, an electric motor and a system having such a control device and such an electric motor.

When a control device for actuating an electric motor is connected to an electric motor to form a system, it is generally necessary to set the actuation-relevant parameters of the electric motor in the control device.

The invention is based on the object of providing a control device for actuating an electric motor, an electric motor and a system having such a control device and such an electric motor, which make it possible to parameterize the control device in the most simple and cost-effective manner possible depending on an electric motor that is to be actuated.

The invention achieves this object by way of a control device for actuating an electric motor, an electric motor and a system having such a control device and such an electric motor, in accordance with the claimed invention.

The control device according to the invention serves to actuate an electric motor. The electric motor may be, for example, a three-phase motor, for example a synchronous motor or an asynchronous motor. The control device according to the invention generates, for example, suitable phase voltages and/or phase currents in such a way that a desired rotational speed and/or a desired torque are produced.

The control device may be, for example, a frequency converter or a servo converter.

The control device has a temperature sensor interface, which is configured to connect an external temperature sensor. The temperature sensor is provided to monitor the temperature of the electric motor.

The control device further has a monitoring unit, for example in the form of a microcontroller and associated peripheral equipment, which monitoring unit is configured to evaluate at least one temperature-dependent property of the temperature sensor, for example the temperature-dependent resistance thereof, in order to monitor the temperature of the electric motor.

The monitoring unit is further configured to exchange data, in particular to exchange data in a bidirectional manner, with the electric motor via the temperature sensor interface independently of the temperature monitoring and in addition to the temperature monitoring. The temperature sensor interface consequently has a double function. On the one hand, it conventionally serves to connect the temperature sensor, on the other hand, it serves at the same time for data exchange with the electric motor, with the result that said electric motor can, for example, when required, transmit the motor-specific parameters thereof to the control device via the temperature sensor interface so that manual setting of said parameters at the control device can be omitted.

In one embodiment, the monitoring unit is configured to output a voltage (or a voltage pattern) and/or a current (or a current pattern) at the temperature sensor interface during specific time intervals or permanently.

In one embodiment, the monitoring unit is configured to evaluate an electrical resistance of the temperature sensor in order to monitor the temperature of the electric motor.

In one embodiment, the monitoring unit is configured to output a prescribed pulse pattern or voltage pattern or current pattern at the temperature sensor interface in order to initiate a data exchange with the electric motor. For example, after it is been switched on, the monitoring unit can initially output a one level at the temperature sensor interface in order to supply a control unit of the electric motor with operating energy and to start said control unit. After a waiting time, the control device can generate one or more level changes of the voltage that is output at the temperature sensor interface, with the result that the control unit of the electric motor can identify that a control unit that is able to communicate is present so that data transmission can begin.

In one embodiment, the monitoring unit is configured to evaluate a signal profile or voltage profile produced at the temperature sensor interface for decoding data transmitted from the electric motor to the control device. For example, the temperature sensor interface can form an open-drain output or an open-collector output, at which a constant voltage with a high level is output via a pull-up resistor during data reception. To encode the data that is to be transmitted from the electric motor to the control device, the control unit of the electric motor can draw the voltage that is output at the temperature sensor interface to a reference potential, for example ground, by means of a switching means, for example a field-effect transistor, so that the reference potential is produced at the temperature sensor interface as a result. In this way, the control unit of the electric motor can generate a desired voltage pulse sequence at the temperature sensor interface, as a result of which the data can be transmitted with binary encoding to the control device.

In one embodiment, the temperature sensor interface is a two-conductor interface.

In one embodiment, the control device has a conventional motor actuating interface for connecting, for example, three phase sections of the electric motor.

The electric motor according to the invention has a temperature monitoring interface, which is provided to be connected to the temperature sensor interface of the control device for the purpose of signal exchange.

The electric motor further has a temperature sensor that is electrically connected to the temperature monitoring interface.

The electric motor further has a control unit, for example in the form of a microcontroller, which is connected to the temperature monitoring interface and which is configured to exchange data, in particular in a bidirectional manner, with a control device via the temperature monitoring interface.

In one embodiment, the control unit is supplied with electrical operating energy, in particular exclusively, via the temperature monitoring interface.

In one embodiment, the electric motor has a switch that can be actuated by means of the control unit, for example in the form of a semiconductor switching means that can be actuated, for example in the form of a thyristor, wherein the switch and the temperature sensor are looped in in series between connection poles of the temperature monitoring interface. The control unit is configured for this case to close the switch in a temperature measuring mode and to open the switch in a data transmission mode.

When the switch is closed, a control device that is connected to the temperature monitoring interface sees only the temperature sensor, that is to say the control device can measure a motor temperature in a conventional manner. Therefore, conventional control devices that are not configured for data exchange with the motor can also be connected to the electric motor according to the invention or to the temperature monitoring interface thereof.

The electric motor or the control unit thereof can identify, for example, a conventional control device from the fact that the control device does not initiate data exchange, that is to say the level at the temperature monitoring interface remains constant. For this case, the switch is closed and the electric motor behaves at the interfaces thereof like a conventional electric motor.

Closing the switch can cause an energy supply of the control unit to be interrupted. However, this is insignificant since the conventional electric motor does not require the control unit to function.

A switching state of the switch can initially be open as standard after the supply of electrical energy to the control unit begins in order to ensure a supply of operating energy to the control unit.

In one embodiment, the temperature sensor is a temperature-dependent resistor.

In one embodiment, the electric motor has a memory, the content of which can be read out and/or can be written to via the temperature monitoring interface. Information that characterizes the properties of the electric motor can be stored in the memory. Furthermore, for example, an operating hours counter, service data etc. for the electric motor can be stored in the memory.

The system according to the invention has an above-described control device and an above-described electric motor.

In one embodiment, the control device is configured to read out the memory of the electric motor, in particular after switch-on, power-on or reset, and to actuate the electric motor depending on the data read out.

The invention realizes an electronic nameplate in an electric motor, which nameplate can be read out via the already present interface for the motor temperature evaluation.

The invention makes it possible to automatically read out/write the electric and mechanical properties of an electric motor without additional wiring between the motor and the control device.

Since at least one cable connection already exists between the control device and the electric motor, said cable connection is concomitantly used according to the invention as a transmission path for the data exchange. For example, frequency converters and electric motors conventionally already have an interface or connection line for monitoring the temperature of the motor. This is now used according to the invention both to read out the motor temperature (analog voltage) and to read out digital data from the electric motor or optionally to store said data there.

The control unit, for example in the form of a microcontroller, is provided in the electric motor, for example in the junction box or connection region thereof, said microcontroller drawing its operating energy from the temperature sensor interface of the control device via the temperature monitoring interface. During normal operation, or if the control device does not have the actuation logic for the electronic nameplate, the control unit is inactive. For this case, the temperature sensor is located between connection poles of the temperature monitoring interface of the electric motor.

When data is intended to be exchanged between the control device and the electric motor, the temperature sensor is decoupled and the control unit of the electric motor becomes active. To this end, the control device can generate a specific pulse pattern at the temperature sensor interface thereof, said pulse pattern in turn being identified and acknowledged by the control unit of the electric motor. The data transmission then starts.

When the control device does not receive a reaction via the temperature sensor interface thereof, the control device can conclude that it is a standard electric motor without electronic nameplate that is involved.

If a conventional control device without nameplate actuation logic is used together with a motor according to the invention with an electronic nameplate, the control unit of the electric motor according to the invention can connect through the switching means after the absence of the initiation of the data exchange or a starting edge so that only the motor temperature monitoring system is active.

According to the invention, it is possible to prevent motor data having to be programmed by hand. In this way, errors in which false motor data are used in the control device can be prevented. This also leads to time saving during installation and start-up of the system.

On account of the pulsed data transmission method, a short circuit of a line that connects the temperature sensor interface of the control device to the temperature monitoring interface of the electric motor can be identified.

BRIEF DESCRIPTION OF THE DRAWINGS

The invention is described below in detail with reference to the drawing, in which:

FIG. 1 shows a system having a control device and an electric motor that is actuated by means of the control device.

DETAILED DESCRIPTION OF THE DRAWINGS

FIG. 1 shows a system having a control device 1 in the form of a frequency converter and a three-phase motor 2, which is actuated by means of the control device 1. For this purpose, the control device 1 conventionally has a motor actuating interface 6 for connecting phase sections u, v, w of the electric motor 2. In this respect, reference should also be made to the relevant technical literature.

The control device 1 further has a temperature sensor interface 3 for connecting a temperature sensor 4 in the form of a PTC thermistor or thermal contact arranged in the electric motor 2. The temperature sensor 4 conventionally serves to monitor the temperature of the electric motor 2.

In a manner corresponding to the temperature sensor interface 3 of the control device 1, the electric motor 2 has a temperature monitoring interface 7, wherein a semiconductor switch 9 and the temperature sensor 4 are looped in in series between connection poles 7a, 7b of the temperature monitoring interface 7. The interfaces 3 and 7 are each two-conductor interfaces.

The temperature sensor interface 3 of the control device 1 and the temperature monitoring interface 7 of the electric motor 2 are electrically connected to one another by means of associated cores of a multicore connection cable 11. Corresponding cores of the connection cable 11 further serve to electrically connect the motor actuating interface 6 of the control device 1 to the phase sections u, v, w of the electric motor 2.

The control device 1 further has a monitoring unit 5, which is configured to conventionally evaluate a resistance of the temperature sensor 4 in order to monitor the temperature of the electric motor 2.

The monitoring unit 5 is further configured to exchange data with the electric motor 2 via the temperature sensor interface 3 independently of and in addition to the temperature monitoring, which will be described in more detail below.

In order to be able to exchange data in a bidirectional manner with the control device 1, the electric motor 2 has a control unit 8, which is likewise connected to the temperature monitoring interface 7 and which is configured to exchange data in a bidirectional manner with the control device 1 via the temperature monitoring interface 7. To this end, the control unit 8 actuates the semiconductor switch 9 in such a way that it is closed in a temperature measuring mode and is open in a data transmission mode.

The monitoring unit 5 of the control device 1 outputs a voltage that serves to supply voltage to the control unit 8 at the temperature sensor interface 3 as long as the switch 9 is open.

A switch-on of the system 1 is described below.

After the control device 1 has been supplied with energy, the control device 1 starts up and outputs a voltage, for example at a level of 3.3 V, at the temperature sensor interface 3 thereof. The output that drives the temperature sensor interface 3 may be, for example, an open-drain output or an open-collector output.

When the switch 9 is open, said voltage charges a buffer capacitor 12 of the electric motor 2 by means of a decoupling diode 13, wherein the control unit 8 is supplied with energy from the buffer capacitor 12. As soon as a voltage level produced at the capacitor 12 is sufficient to supply power to the control unit 8, the control unit 8 continually checks a voltage profile at the temperature monitoring interface 7.

In order to initiate a data exchange with the electric motor 2 or the control unit 8 thereof, the monitoring unit 5 generates a defined voltage pulse pattern at the temperature sensor interface 3 for a prescribed period. Said voltage pulse pattern is identified by the control unit 8 and used to synchronize or initiate the data transmission.

For the transmission of data from the control unit 8 in the direction of the monitoring unit 5, the control unit 8 has a semiconductor switching element, which is not illustrated, wherein for example approximately 3.3 V are produced at the temperature sensor interface 3 in the open state of said semiconductor switching element and approximately 0 V is produced in the closed state of the semiconductor switching element, with the result that the control unit 8 can generate by means of the semiconductor switching element a pulse sequence that serves to encode the data that is to be transmitted.

For the transmission of data from the monitoring unit 5 in the direction of the control unit 8, the monitoring unit 5 generates a suitable voltage pulse pattern at the temperature sensor interface 3 to encode the data that is to be transmitted.

After all of the necessary data has been transmitted between the control device 1 or the monitoring unit 5 and the control unit 8, the control unit 8 closes the switch 9, as a result of which said control unit itself is switched off and only the temperature sensor 4 remains visible between the connection poles 7a and 7b.

When the control device 1 does not generate the defined voltage pulse pattern at the temperature sensor interface 3 for initiating the data transmission after start-up within the prescribed period, the control unit 8 closes the switch 9, as a result of which said control unit itself is switched off and only the temperature sensor 4 remains visible between the connection poles 7a and 7b. Therefore, the electric motor 2 according to the invention is also able to be used with conventional control devices that do not have the option of data transmission via their temperature sensor interface 3.

When a control device 1 according to the invention is used with a conventional electric motor that does not have the option of data transmission via its temperature monitoring interface 7, the control device 1 identifies this from the fact that no reaction to the temperature sensor interface 3 is received after the initiation of the data transmission. The control device 1 according to the invention is therefore also able to be used with conventional electric motors that do not have the option of data transmission via their temperature monitoring interface 7.

The electric motor 2 has a non-volatile memory 10, the content of which can be read out and/or can be written to via the temperature monitoring interface 7. Information that characterizes the properties of the electric motor 2 is stored in the memory 10. In addition, a serial number, an operating hours counter, etc. can be stored in the memory 10.

The control device 1 is configured to at least partly read out the memory 10 of the electric motor 2 and to actuate the electric motor 2 depending on the data read out.

For example, a rated power, a current carrying capacity, electrical parameters, etc. that influence the actuation voltages/actuation currents generated by the control device 1 can be stored in the memory 10.

What is claimed is:

1. A control device for actuating an electric motor, comprising:
    a temperature sensor interface for connecting an external temperature sensor, wherein the external temperature sensor is provided to monitor temperature of the electric motor; and
    a monitoring unit, which is configured to evaluate at least one temperature-dependent property of the temperature sensor in order to monitor the temperature of the electric motor,
    wherein the monitoring unit is further configured to exchange data with the electric motor via the temperature sensor interface independently of and in addition to the temperature monitoring.

2. The control device according to claim 1, wherein the monitoring unit is configured to output a voltage or a current at the temperature sensor interface.

3. The control device according to claim 2, wherein the monitoring unit is configured to evaluate an electrical resistance of the temperature sensor in order to monitor the temperature of the electric motor.

4. The control device according to claim 1, wherein the monitoring unit is configured to evaluate an electrical resistance of the temperature sensor in order to monitor the temperature of the electric motor.

5. The control device according to claim 1, wherein the monitoring unit is configured to output a prescribed pulse pattern at the temperature sensor interface in order to initiate a data exchange with the electric motor.

6. The control device according to claim 1, wherein the monitoring unit is configured to evaluate a signal profile produced at the temperature sensor interface for decoding data transmitted from the electric motor to the control device.

7. The control device according to claim 1, wherein the temperature sensor interface is a two-conductor interface.

8. The control device according to claim 1, further comprising:
    a motor actuating interface for connecting phase sections of the electric motor.

9. An electric motor, comprising:
a temperature monitoring interface; and
a temperature sensor that is connected to the temperature monitoring interface,
wherein the electric motor comprises:
 a control unit, which is connected to the temperature monitoring interface and which is configured to exchange data with a control device via the temperature monitoring interface independently of and in addition to the temperature monitoring.

10. The electric motor according to claim 9, wherein the control unit is supplied with electrical operating energy via the temperature monitoring interface.

11. The electric motor according to 9, wherein
the electric motor has a switch that is actuated by the control unit, wherein the switch and the temperature sensor are looped in in series between connection poles of the temperature monitoring interface, and
the control unit is configured to close the switch in a temperature measuring mode and to open the switch in a data transmission mode.

12. The electric motor according to claim 9, wherein the temperature sensor is a temperature-dependent resistor or a thermal contact.

13. The electric motor according to claim 9, wherein the electric motor has a memory, a content of which is readable out and/or writable to via the temperature monitoring interface.

14. The electric motor according to claim 13, wherein information that characterizes properties of the electric motor is stored in the memory.

15. A system, comprising:
(i) an electric motor comprising:
 a temperature monitoring interface;
 a temperature sensor that is connected to the temperature monitoring interface; and
 a motor control unit, which is connected to the temperature monitoring interface and which is configured to exchange data via the temperature monitoring interface; and
(ii) a control device comprising:
 a temperature sensor interface for connecting the temperature sensor, wherein the temperature sensor is provided to monitor temperature of the electric motor; and
 a monitoring unit, which is configured to evaluate at least one temperature-dependent property of the temperature sensor in order to monitor the temperature of the electric motor, wherein the monitoring unit is further configured to exchange data with the electric motor via the temperature sensor interface independently of and in addition to the temperature monitoring.

16. The system according to claim 15, wherein
the control device is configured to read out a memory of the electric motor and to actuate the electric motor depending on data read out from the memory.

\* \* \* \* \*